(12) United States Patent
Matsushima et al.

(10) Patent No.: US 10,648,411 B2
(45) Date of Patent: May 12, 2020

(54) CONTROLLER AND CONTROL METHOD FOR INTERNAL COMBUSTION ENGINE

(71) Applicants: Mitsubishi Electric Corporation, Tokyo (JP); MAZDA MOTOR CORPORATION, Hiroshima (JP)

(72) Inventors: Yuhei Matsushima, Tokyo (JP); Nobuhiko Yokoyama, Hiroshima (JP); Hiroki Morimoto, Hiroshima (JP)

(73) Assignees: Mitsubishi Electric Corporation, Chiyoda-ku, Tokyo (JP); MAZDA MOTOR CORPORATION, Aki-gun, Hiroshima (JP)

( * ) Notice: Subject to any disclaimer, the term of this patent is extended or adjusted under 35 U.S.C. 154(b) by 259 days.

(21) Appl. No.: 15/587,457

(22) Filed: May 5, 2017

(65) Prior Publication Data

US 2017/0350328 A1     Dec. 7, 2017

(30) Foreign Application Priority Data

Jun. 7, 2016   (JP) ................. 2016-113188

(51) Int. Cl.
*F02D 35/02*    (2006.01)
*F02D 41/28*    (2006.01)
(Continued)

(52) U.S. Cl.
CPC ............ *F02D 35/027* (2013.01); *F01L 1/344* (2013.01); *F02D 41/1498* (2013.01);
(Continued)

(58) Field of Classification Search
CPC .. F02D 35/027; F02D 41/1498; F02D 35/023; F02P 5/152; F01L 1/344; F01L 2820/041; F01L 1/34; Y02T 10/40
See application file for complete search history.

(56) References Cited

U.S. PATENT DOCUMENTS

| | | | | |
|---|---|---|---|---|
| 4,750,103 A | * | 6/1988 | Abo ................. | F02P 5/152 |
| | | | | 123/406.37 |
| 5,190,011 A | * | 3/1993 | Hashimoto ........... | F02P 5/1525 |
| | | | | 123/406.38 |

(Continued)

FOREIGN PATENT DOCUMENTS

| JP | 2542116 B2 | 10/1996 |
|---|---|---|
| JP | 2007-154760 A | 6/2007 |

*Primary Examiner* — Joseph J Dallo
*Assistant Examiner* — Kurt Philip Liethen
(74) *Attorney, Agent, or Firm* — Sughrue Mion, PLLC; Richard C. Turner

(57) ABSTRACT

To provide a controller and a control method, for an internal combustion engine, that can detect occurrence of knocking appropriately, even though the frequency distribution of the knock signal is distorted according to the occurrence state of knocking. The controller for the internal combustion engine calculates the background level by processing a low pass filter to the knock signal; and performs a low side frequency increase which makes a low side frequency, which is a cutoff frequency of the low pass filter in the case where the knock signal is smaller than an output value of the low pass filter, higher than a high side frequency, which is a cutoff frequency of the low pass filter in the case where the knock signal is larger than the output value of the low pass filter.

10 Claims, 10 Drawing Sheets

(51) Int. Cl.
*F01L 1/344* (2006.01)
*F02D 41/14* (2006.01)
*F01L 1/34* (2006.01)
*F02D 41/00* (2006.01)
*F02D 41/32* (2006.01)
*F02P 5/152* (2006.01)

(52) U.S. Cl.
CPC ............... *F02D 41/28* (2013.01); *F01L 1/34* (2013.01); *F01L 2820/041* (2013.01); *F02D 35/023* (2013.01); *F02D 41/0002* (2013.01); *F02D 41/32* (2013.01); *F02D 2041/001* (2013.01); *F02D 2041/1432* (2013.01); *F02D 2041/286* (2013.01); *F02D 2041/288* (2013.01); *F02P 5/152* (2013.01); *Y02T 10/40* (2013.01)

(56) References Cited

U.S. PATENT DOCUMENTS

| | | | | |
|---|---|---|---|---|
| 5,379,634 | A * | 1/1995 | Kuroda | G01M 15/11 73/114.04 |
| 2004/0030486 | A1* | 2/2004 | Sauler | F02P 5/152 701/111 |
| 2005/0241369 | A1* | 11/2005 | Inoue | G01L 23/225 73/35.09 |
| 2009/0182491 | A1* | 7/2009 | Bauer | F02D 35/023 701/115 |
| 2010/0212634 | A1 | 8/2010 | Yoshihara et al. | |
| 2013/0218443 | A1* | 8/2013 | Tanaka | G01L 23/225 701/111 |
| 2013/0226385 | A1* | 8/2013 | Ueno | B60L 15/20 701/22 |
| 2017/0270770 | A1* | 9/2017 | Marshall | B65G 21/18 |
| 2017/0294896 | A1* | 10/2017 | Nosaka | H03H 9/72 |

* cited by examiner

CONTROLLER AND CONTROL METHOD FOR INTERNAL COMBUSTION ENGINE

INCORPORATION BY REFERENCE

The disclosure of Japanese Patent Application. No. 2016-113188 filed on Jun. 7, 2016 including its specification, claims and drawings, is incorporated herein by reference in its entirety.

BACKGROUND

The present invention relates to a controller and a control method for controlling knocking which occurs in an internal combustion engine.

To date, there has been known a controller which detects the knocking phenomena which occur in an internal combustion engine by the vibration sensor (hereinafter, referred to as a knock sensor) directly attached to a cylinder block of the internal combustion engine. Since vibration of the natural frequency band according to bore size of the internal combustion engine or vibration mode of knocking occurs when knocking occurs during operation of the internal combustion engine, the controller detects knocking by measuring the vibration strength of this natural frequency.

As the characteristic of the internal combustion engine, when ignition timing is changed to the advance angle side, the output torque of the internal combustion engine increase, but knocking is easy to occur. Accordingly, the controller performs knock control which suppresses knocking by correcting ignition timing to the retard angle side in the case of detecting knocking, and suppresses drop of the output torque of the internal combustion engine by returning ignition timing to the advance angle side in the case of not detecting knocking. Ignition timing is controlled by knock control at the knock limit ignition timing which is ignition timing of most advance side of just before knocking occurs.

As technology of performing such knock control, the technology described in Japanese Patent No. 2542116 and Japanese Patent Application No. JP-A-2007-154760 is already known, for example. In the technology of Japanese Patent No. 2542116, an average value of a knock signal calculated by processing a low pass filter to the knock signal is set as a background level, a knock decision threshold is calculated by multiplying a gain and adding an offset to the background level, and occurrence of knocking is determined by comparing the knock decision threshold with the knock signal.

In the technology of JP-A-2007-154760, a median of the knock signal which was log transformed and a standard deviation of the knock signal are calculated, a background level is calculated by subtracting a value, which multiplied a constant to the standard deviation, from the median of the knock signal, and a knock occurrence intensity is calculated by dividing the knock signal by the background level.

SUMMARY

However, in the technology of Japanese Patent No. 2542116, frequency distribution of the knock signal may be distorted depending on the occurrence state of knocking, and the average value (the background level) of the knock signal calculated by the low pass filter may shift above an expected value. As a result, the knock decision threshold also shifts above a desirable value; although knocking occurs, occurrence of knocking cannot be detected appropriately; there has been a problem which cannot perform an angle retard of ignition timing appropriately.

In the technology of JP-A-2007-154760, since the background level is calculated by subtracting the value, which multiplied the constant to the standard deviation, from the median of the knock signal, in the case where frequency distribution of the knock signal is distorted, the median and the standard deviation of the knock signal are varied in accordance with the distortion. As a result, the background level deviates below the distribution range of the knock signal, or the background level approaches the median of the knock signal, and by distortion of the frequency distribution of the knock signal, the setting position of the background level to the distribution range of the knock signal is varied. In the technology of JP-A-2007-154760, square calculation and square root calculation are needed for calculation of the standard deviation, and processing load of computing processing unit increases.

Thus, it is desirable to provide a controller and a control method for an internal combustion engine which can detect occurrence of knocking appropriately, even though the frequency distribution of the knock signal is distorted according to the occurrence state of knocking.

According to an first aspect of the present invention, a controller for an internal combustion engine includes:

a knock signal calculator that calculates a knock signal, which represents a feature component of knocking, based on an output signal of a combustion condition detection sensor which outputs a signal in accordance with a combustion condition of the internal combustion engine;

a BGL calculator that calculates a background level based on the knock signal;

a knock decision threshold calculator that calculates a knock decision threshold based on the background level;

a knock intensity calculator that calculates a knock occurrence intensity based on the knock signal and the knock decision threshold; and a knock controller that changes a control parameter of the internal combustion engine so as to suppress occurrence of knocking in accordance with the knock occurrence intensity, wherein the BGL calculator calculates the background level by processing a low pass filter to the knock signal; and performs a low side frequency increase which makes a low side frequency, which is a cutoff frequency of the low pass filter in the case where the knock signal is smaller than an output value of the low pass filter, higher than a high side frequency, which is a cutoff frequency of the low pass filter in the case where the knock signal is larger than the output value of the low pass filter.

According to an second aspect of the present invention, a controller for an internal combustion engine includes:

a knock signal calculator that calculates a knock signal, which represents a feature component of knocking, based on an output signal of a combustion condition detection sensor which outputs a signal in accordance with a combustion condition of the internal combustion engine;

a BGL calculator that calculates a background level based on the knock signal;

a knock decision threshold calculator that calculates a knock decision threshold based on the background level;

a knock intensity calculator that calculates a knock occurrence intensity based on the knock signal and the knock decision threshold; and a knock controller that changes a control parameter of the internal combustion engine so as to suppress occurrence of knocking in accordance with the knock occurrence intensity, wherein the BGL calculator calculates the background level by performing a minimum value detection processing to the knock signal.

According to an third aspect of the present invention, a control method for an internal combustion engine includes:

a knock signal calculating that calculates a knock signal, which represents a feature component of knocking, based on an output signal of a combustion condition detection sensor which outputs a signal in accordance with a combustion condition of the internal combustion engine;

a BGL calculating that calculates a background level based on the knock signal;

a knock decision threshold calculating that calculates a knock decision threshold based on the background level;

a knock intensity calculating that calculates a knock occurrence intensity based on the knock signal and the knock decision threshold; and a knock controlling that changes a control parameter of the internal combustion engine so as to suppress occurrence of knocking is accordance with the knock occurrence intensity, wherein the BGL calculating calculates the background level by processing a low pass filter to the knock signal; and performs a low side frequency increase which makes a low side frequency, which is a cutoff frequency of the low pass filter in the case where the knock signal is smaller than an output value of the low pass filter, higher than a high side frequency, which is a cutoff frequency of the low pass filter in the case where the knock signal is larger than the output value of the low pass filter.

According to an fourth aspect of the present invention, a control method for an internal combustion engine includes:

a knock signal calculating that calculates a knock signal, which represents a feature component of knocking, based on an output signal of a combustion condition detection sensor which outputs a signal in accordance with a combustion condition of the internal combustion engine;

a BGL calculating that calculates a background level based on the knock signal;

a knock decision threshold calculating that calculates a knock decision threshold based on the background level;

a knock intensity calculating that calculates a knock occurrence intensity based on the knock signal and the knock decision threshold; and a knock controlling that changes a control parameter of the internal combustion engine so as to suppress occurrence of knocking in accordance with the knock occurrence intensity, wherein the BGL calculating calculates the background level by performing a minimum value detection processing to the knock signal.

According to the controller and the control method for the internal combustion engine according to the present invention, since the background level is set close to the minimum value side of the frequency distribution within the range of the frequency distribution of the knock signal, it is hardly influenced by the distortion of frequency distribution of the knock signal according to the occurrence state of knocking. Therefore, regardless of the distortion of frequency distribution of the knock signal, the knock decision threshold can be set appropriately, occurrence of knocking can be detected appropriately, and occurrence of knocking can be suppressed.

DETAILED DESCRIPTION OF THE EMBODIMENTS

Embodiment 1

Figure 1:
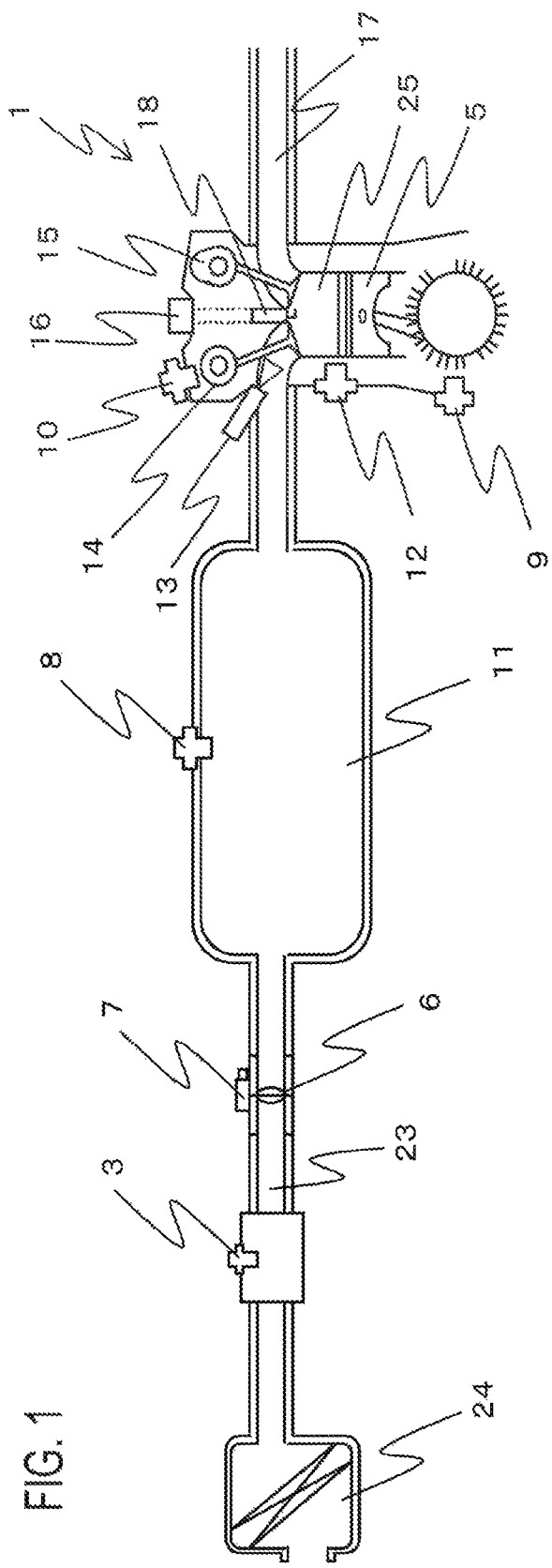
FIG. 1 is a schematic configuration diagram of an internal combustion engine according to Embodiment 1 of the present invention.

A controller 50 for an internal combustion engine 1 (hereinafter, referred to simply as the controller 50) according to Embodiment 1 will be explained with reference to the drawings. FIG. 1 is a schematic configuration diagram of the internal combustion engine 1 according to the present embodiment. Although the internal combustion engine 1 is provided with a plurality of cylinders 25 and pistons 5 according to the present embodiment, only the one cylinder 25 and the piston 5 are shown in FIG. 1 for convenience. The internal combustion engine 1 and the controller 50 are mounted in a vehicle; the internal combustion engine 1 functions as a driving-force source for the vehicle (wheels).

1. The Configuration of the Internal Combustion Engine 1

The configuration of the internal combustion engine 1 will be explained. The internal combustion engine 1 has a cylinder 25 in which a fuel-air mixture is combusted. The internal combustion engine 1 has an intake path 23 for supplying air to the cylinder 25 and an exhaust path 17 for discharging exhaust gas combusted in the cylinder 25. The internal combustion engine 1 has a throttle valve 6 for opening and closing the intake path 23. The throttle valve 6 is an electronically controlled throttle valve that is opening/closing-driven by an electric motor controlled by the controller 50. The throttle valve 6 is provided with a throttle opening degree sensor 7 that generates an electric signal corresponding to a throttle opening degree of the throttle valve 6.

An air cleaner 24 for purifying air taken into the intake path 23 is provided at the most upstream portion of the intake path 23. An air flow sensor 3 which outputs an electric signal according to an intake air amount taken into the intake path 23 is provided in intake path 23 of the upstream of throttle valve 6. The part of the intake path 23 of the downstream of the throttle valve 6 is an intake manifold 11, and is connected to a plurality of cylinders 25. The upstream portion of the intake manifold 11 is a surge tank for suppressing an intake pulsation.

A manifold pressure sensor 8 which outputs an electric signal according to a manifold pressure which is a gas pressure in the intake manifold 11 is provided in the intake manifold 11. Either one of the air flow sensor 3 or the manifold pressure sensor 8 may be provided. An injector 13 for injecting a fuel is provided at the downstream side part of the intake manifold 11. The injector 13 may be provided so as to inject a fuel directly into the cylinder 25.

An ignition plug 18 for igniting a fuel-air mixture and an ignition coil 16 for supplying ignition energy to the ignition plug 18 are provided on the top of the cylinder 25. On the top of the cylinder 25, there are provided an intake valve 14 for adjusting the amount of intake air to be taken from the intake path 23 into the cylinder 25 and an exhaust valve 15 for adjusting the amount of exhaust gas to be exhausted from the cylinder to the exhaust path 17. The intake valve 14 is provided with an intake variable valve timing mechanism that makes the opening and closing timing thereof variable. The intake variable valve timing mechanism 14 has an electric actuator which changes the opening and closing timing of the intake valve.

A crankshaft of the internal combustion engine 1 is provided with a signal plate in which a plurality of teeth were provided in the outer circumference with the preliminarily set angle interval. A crank angle sensor 9 is fixed to a cylinder block so as to oppose the tooth of the signal plate of the crankshaft and outputs a pulse signal synchronizing with passage of the tooth. Although not shown in the figure, a cam shaft of the internal combustion engine 1 is provided with a signal plate in which a plurality of teeth were provided in the outer circumference with the preliminarily set angle interval. A cam angle sensor 10 is fixed so as to oppose the tooth of the signal plate of the cam shaft and outputs a pulse signal synchronizing with passage of the tooth.

Based on two kinds of output signals of the crank angle sensor 9 and the cam angle sensor 10, the controller 50 detects a crank angle on the basis of the top dead center of each piston 5 and determines a stroke of each cylinder 25.

A knock sensor 12 is fixed to the cylinder block. The knock sensor 12 outputs a signal (vibration waveform signal) according to vibration of the internal combustion engine 1. The knock sensor 12 is configured by the piezoelectric element and the like.

2. The Configuration of the Controller 50

Figure 2:
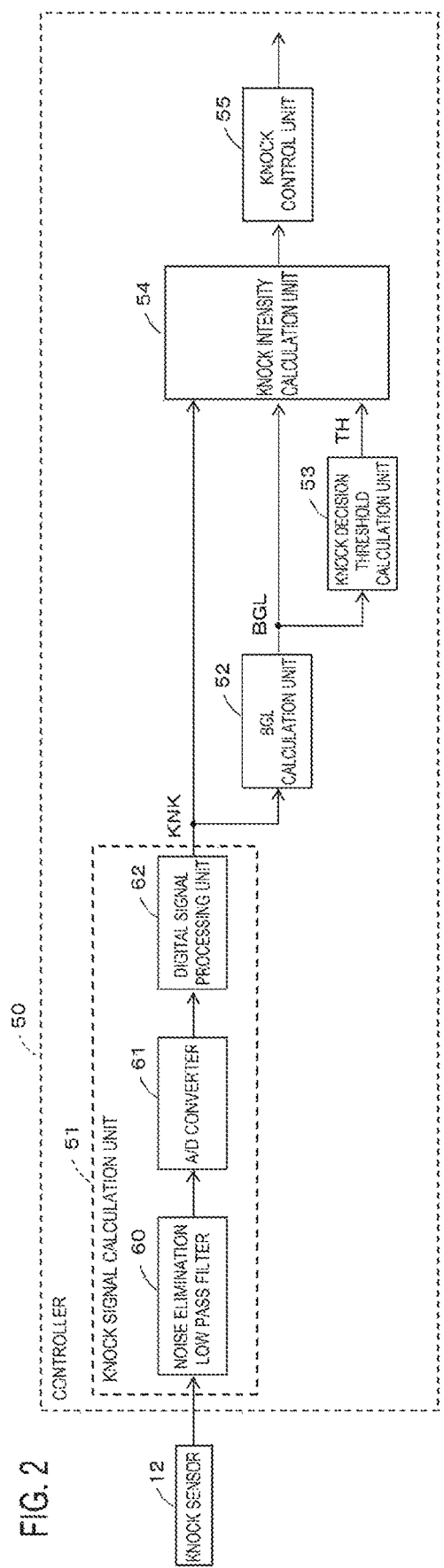
FIG. 2 is a block diagram of a controller according to Embodiment 1 of the present invention.
Figure 3:
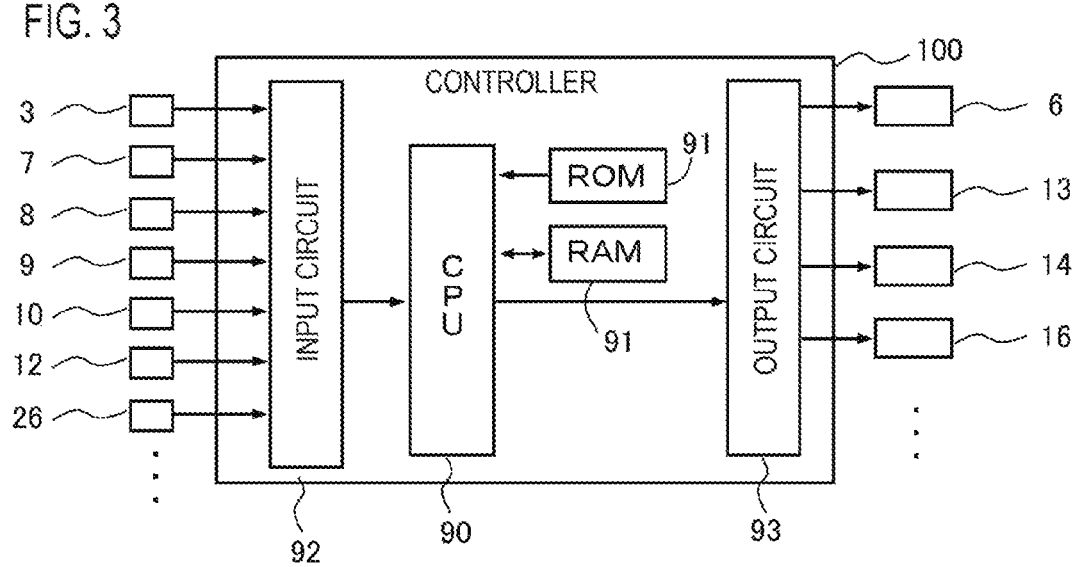
FIG. 3 is a hardware configuration diagram of the controller according to Embodiment 1 of the present invention.

Next, the controller 50 will be explained. The controller 50 is the one whose control subject is the internal combustion engine 1. As shown in the block diagram of FIG. 2, the controller 50 is provided with control units of a knock signal calculation unit 51, a BGL calculation unit 52, a knock decision threshold calculation unit 53, a knock intensity calculation unit 54, a knock control unit 55 and the like. The respective control units 51 through 55 and the like of the controller 50 are realized by processing circuits included in the controller 50. Specifically, as shown in FIG. 3, the controller 50 includes, as a processing circuit, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

As the storage apparatuses 91, there are provided a RAM (Random Access Memory) that can read data and write data from the computing processing unit 90, a ROM (Read Only Memory) that can read data from the computing processing unit 90, and the like. The input circuit 92 is connected with various kinds of sensors and switches and is provided with an A/D converter and the like for inputting output signals from the sensors and the switches to the computing processing unit 90. The output circuit 93 is connected with electric loads and is provided with a driving circuit and the like for outputting a control signal from the computing processing unit 90.

In addition, the computing processing unit 90 runs software items (programs) stored in the storage apparatus 91 such as a ROM and collaborates with other hardware devices in the controller 50, such as the storage apparatus 91, the input circuit 92, and the output circuit 93, so that the respective functions of the control units 51 through 55 included in the controller 50 are realized. Setting data items such as filter gain to be utilized in the control units 51 through 55 are stored, as part of software items (programs), in the storage apparatus 91 such as a ROM.

In the present embodiment, the input circuit 92 is connected with the air flow sensor 3, the throttle position sensor 7, the manifold pressure sensor 8, the crank angle sensor 9, the cam angle sensor 10, the knock sensor 12, the accelerator position sensor 26, and the like. The output circuit 93 is connected with the throttle valve 6 (electric motor), the injector 13, the intake variable valve timing mechanism 14, the ignition coil 16, and the like. The controller 50 is connected with various kinds of unillustrated sensors, switches, actuators, and the like.

The controller 50 detects an intake air amount based on the output signal of the air flow sensor 3 or the manifold pressure sensor 8 and the like, detects a throttle opening angle based on the output signal of the throttle position sensor 7, and detects an accelerator opening degree based on the output signal of the accelerator position sensor 26. The controller 50 detects an angle and a rotational speed of the crankshaft, and the opening and closing timing of the intake valve 14 based on the output signal of the crank angle sensor 9 and the cam angle sensor 10.

As basic control, the controller 50 calculates fuel injection amount, ignition timing, and the like, based on inputted output signals and the like from the various kinds of sensors, and then performs driving control of the injector 13, the ignition coil 16, and the like. Based on the accelerator opening degree and the like, the controller 50 calculates the output torque of the internal combustion engine 1, demanded by the driver, and then controls the throttle valve 6 and the like so that an intake air amount for realizing the demanded output torque is obtained. Specifically, the controller 50 calculates a target throttle opening degree and then performs driving control of the electric motor for the throttle valve 6 so that the throttle opening degree approaches the target throttle opening degree. The controller 50 calculates a target opening and closing timing of the intake valve 14 based on the rotational speed of the crankshaft (internal combustion engine 1), the intake air amount, and the like, and then performs drive control of the electric actuator for the intake variable valve timing mechanism 14 so that the opening and closing timing of the intake valve 14 approaches the target opening and closing timing.

<Knock Signal Calculation Unit 51>

The knock signal calculation unit 51 calculates a knock signal KNK, which represents a feature component of knocking, based on an output signal of a combustion condition detection sensor which outputs a signal in accordance with a combustion condition of the internal combustion engine 1. In the present embodiment, the combustion condition detection sensor is the knock sensor 12. As shown in FIG. 2, the knock signal calculation unit 51 is provided with a noise elimination low pass filter 60 for eliminating a high frequency noise component from the output signal of the knock sensor 12, an A/D converter 61 for inputting the output value of the noise elimination low pass filter 60 into the computing processing unit 90, and a digital signal processing unit 62 which performs digital signal processing to an A/D conversion value in the computing processing unit 90. The noise elimination low pass filter 60 and the A/D converter 61 configure the input circuit 92.

As mentioned above, the noise elimination low pass filter 60 receives the vibration waveform signal of the internal combustion engine 1 outputted from the knock sensor 12, and eliminates a high frequency noise component from the vibration waveform signal. The noise elimination low pass filter 60 is configured so that the bias voltage of 2.5 [V] is applied to the signal of before or after the filter; the output signal of the filter oscillates in the range of 0 [V] to 5 [V] centering on 2.5 [V]; whole oscillation range is made to be converted by the A/D converter 61. The noise elimination low pass filter 60 also has a gain conversion function which amplifies the signal centering on 2.5 [V] in the case where oscillation range of signal is small, and decreases the signal in the case where oscillation range of signal is large.

The A/D converter 61 performs the A/D conversion of an analog signal outputted from the noise elimination low pass filter 60 to a digital signal. This A/D conversion is performed for each constant time interval, for example, 10 [µs] or 20 [µs].

The A/D converter 61 always performs the A/D conversion, and transmits only the data of a knock detection period corresponding to a knock occurrence period (for example, from the top dead center (TDC: Top Death Center) of the piston to 50 degrees CA after top dead center (ATDC: After Top Death Center)) to the digital signal processing unit 62 among the data after the A/D conversion. Alternatively, the A/D converter 61 may perform the A/D conversion only during the knock detection period and transmit the data after the A/D conversion to the digital signal processing unit 62.

The digital signal processing unit 62 performs time-frequency analysis to the digital signal inputted from the A/D converter 61. For example, the digital signal processing unit 62 calculates a spectrum column of a knock natural frequency component for each predetermined time by processing of discrete Fourier transform (DFT) or short time Fourier transformation (STFT). Alternatively, the digital signal processing unit 62 may extract the knock natural frequency component using an infinite impulse response (IIR) filter or a finite impulse response (FIR) filter. The digital signal processing unit 62 calculates a peak value of the spectrum column as the knock signal KNK. The digital signal processing unit 62 may calculate an average value of the spectrum column as the knock signal KNK.

Processing of the BGL calculation unit 52, the knock decision threshold calculation unit 53, the knock intensity calculation unit 54, and the knock control unit 55 using the knock signal KNK is carried out in an interrupt process synchronizing with a preliminarily set crank angle (For example, interrupt process of 75 degrees CA before top dead center (BTDC: Before Top Death Center)). Therefore, the digital signal processing unit 62 ends processing by the start of the interrupt process of BGL calculation unit 52 and the like. "(n)" described below shows the value calculated by this time interrupt process, and "(n−1)" shows the value calculated by the last time interrupt process.

<Knock Decision Threshold Calculation Unit 53>

The knock decision threshold calculation unit 53 calculates a knock decision threshold TH based on a background level BGL which the BGL calculation unit 52 mentioned below calculated. In the present embodiment, the knock decision threshold calculation unit 53 calculates a value, which multiplied a threshold value calculation coefficient Kth on the background level BGL, as the knock decision threshold TH, as shown in a next equation.

$$TH(n) = Kth \times BGL(n) \quad (1)$$

The threshold value calculation coefficient Kth is a value adapted so that the determination result of knock occurrence intensity becomes appropriate, for example, the value about "3" is set.

<Knock Intensity Calculation Unit 54>

The knock intensity calculation unit 54 determines a knock occurrence intensity IKNK based on the knock signal KNK and the knock decision threshold TH. In the present embodiment, the knock intensity calculation unit 54 calculates a value which divided a value, which subtracted the knock decision threshold TH from the knock signal KNK, by the background level BGL as the knock occurrence intensity IKNK, as shown in a next equation. In this way, the subtraction value is divided by the background level BGL and normalized. Since the background level BGL according to the present embodiment is hardly influenced by distortion of the knock signal KNK as described later, the knock occurrence intensity IKNK after normalization also be hardly influenced by distortion.

$$IKNK(n) = (KNK - TH(n))/BGL(n) \quad (2)$$

When the knock signal KNK exceeds the knock decision threshold TH and knock occurrence intensity IKNK becomes a positive value, it represents that knocking occurred; in proportion to the excess amount in which the knock signal KNK exceeded the knock decision threshold TH, the knock occurrence intensity IKNK becomes large.

<Knock Control Unit 55>

The knock control unit 55 changes a control parameter of the internal combustion engine 1 so as to suppress occurrence of knocking in accordance with the knock occurrence intensity IKNK. In the present embodiment, the knock control unit 55 changes ignition timing as the control parameter of the internal combustion engine 1. In the case where the knock occurrence intensity IKNK is positive and it determines with knocking occurring, the knock control unit 55 calculates a value which performed a lower limitation of a value, which multiplied a preliminarily set retard angle amount calculation coefficient Kg and −1 to the knock occurrence intensity IKNK, by a preliminarily set maximum retard angle amount ΔθRmin as a retard angle updating amount ΔθR, as shown in a next equation. The retard angle updating amount ΔθR becomes a negative value. On the other hand, in the case where the knock occurrence intensity IKNK is negative (in this example, less than or equal to 0) and it determines with knocking not occurring, the knock control unit 55 sets 0 to the retard angle updating amount ΔθR. Here, max {A, B} is a function which outputs the maximum value of A and B.

1) IKNK>0

$$\Delta\theta R(n) = \max\{-Kg \times IKNK(n), \Delta\theta R\min\}$$

2) IKNK<=0 (3)

$$\Delta\theta R(n) = 0$$

Then, the knock control unit 55 calculates a retard angle correction amount θR by integrating the retard angle updating amount ΔθR for each interrupt process, as shown in a next equation.

$$\theta R(n) = \min\{\theta R(n-1) + \Delta\theta R(n) + Ka, \theta R\max\} \quad (4)$$

Here, Ka is a preliminarily set return amount to the advance angle side, and returns the retard angle correction amount θR to advance angle side gradually in the case where the knock occurrence intensity IKNK is negative and it determines with knocking not occurring (ΔθR(n)=0). θRmax is a preliminarily set maximum value of advance angle side and is an upper limit value of the retard angle correction amount θR. min {A, B} is a function which outputs the minimum value of A and B.

The knock control unit 55 sets a value which added the retard angle correction amount θR to a basic ignition timing θB as a final ignition timing θIG, as shown in a next equation.

$$\theta IG(n) = \theta B(n) + \theta R(n) \quad (5)$$

The basic ignition timing θB is a basic ignition timing calculated based on the operating condition of the internal combustion engines 1, such as the rotational speed of the internal combustion engine 1, a charging efficiency, and an exhaust gas recirculation amount, and is usually set to the ignition timing which torque becomes maximum. The controller 50 performs an energization control to the ignition coil 16 based on the final ignition timing θIG and the crank angle.

<BGL Calculation Unit 52>

The BGL calculation unit 52 calculates the background level BGL based on the knock signal KNK. The BGL calculation unit 52 calculates the background level BGL by processing a low pass filter to the knock signal KNK.

Figure 4:
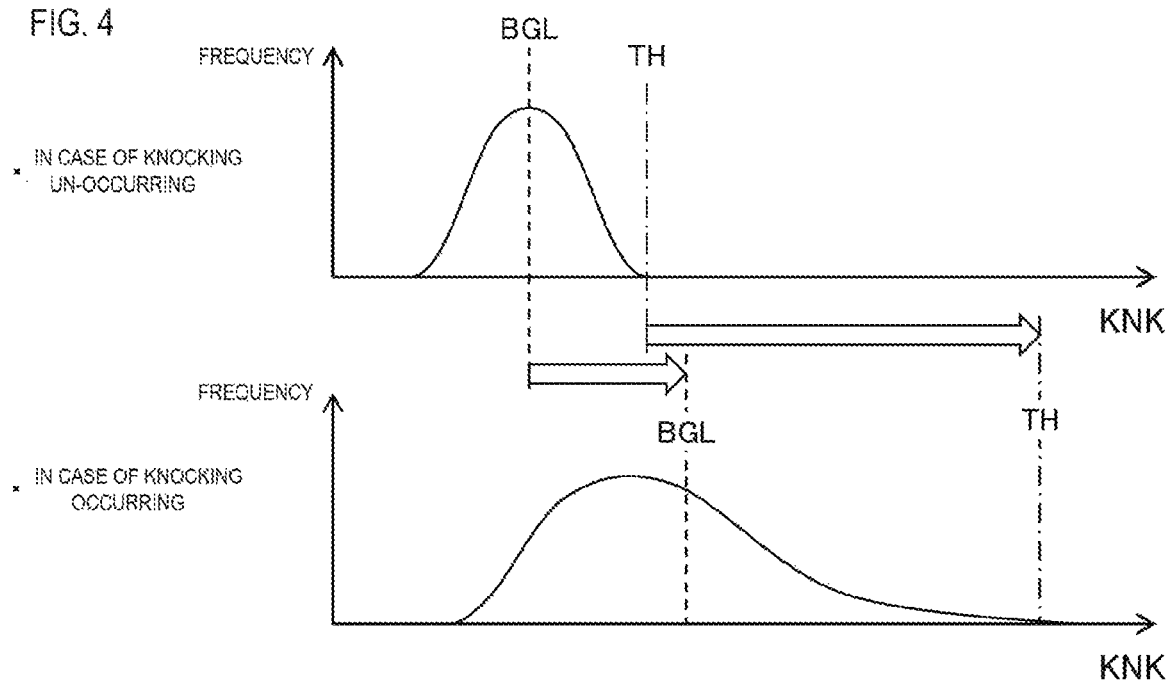
FIG. 4 is a figure for explaining calculation of background level according to a comparative example.

Here, the problem of a comparative example which is different from the present embodiment is explained. As the frequency distribution of the knock signal KNK is shown in FIG. 4, in the comparative example, an average value of the knock signal KNK is calculated as the background level BGL by processing the usual low pass filter, which does not change cutoff frequency, to the knock signal KNK; the knock decision threshold TH is calculated by multiplying the threshold value calculation coefficient Kth to the average value (BGL) of the knock signal KNK. As shown in the upper graph of FIG. 4, in the case where knocking does not occur, the frequency distribution of the knock signal KNK is close to a normal distribution, and the average value (BGL) of the knock signal KNK is calculated near the peak value of frequency distribution. And the threshold value calculation coefficient Kth is adjusted so that the knock decision threshold TH is set near the upper end of frequency distribution; the knock occurrence intensity IKNK becomes small.

On the other hand, when knocking occurs, the frequency distribution of the knock signal KNK spreads. Therefore, usually, the knock signal KNK which becomes larger than the knock decision threshold TH increases, and then the knock occurrence intensity IKNK becomes large. However, as shown in the lower graph of FIG. 4, the frequency distribution of the knock signal KNK is distorted depending on occurrence state of knocking, and the average value (BGL) of the knock signal KNK may shift from the peak value of frequency distribution to upper side. As a result, the knock decision threshold TH also shifts above a desirable value; although knocking occurs, the knock occurrence intensity IKNK becomes small; there has been a problem which cannot perform an angle retard of the ignition timing appropriately.

Accordingly, in the present embodiment, the BGL calculation unit 52 performs a low side frequency increase which makes a low side frequency, which is a cutoff frequency of the low pass filter in the case where the knock signal KNK is smaller than an output value of the low pass filter, higher than a high side frequency, which is a cutoff frequency of the low pass filter in the case where the knock signal KNK is larger than the output value of the low pass filter.

By performing such the low side frequency increase, relatively, the knock signal KNK which is smaller than the output value of the low pass filter becomes easy to pass the low pass filter, and the knock signal KNK which is larger than the output value of the low pass filter becomes difficult to pass the low pass filter. Therefore, as shown in the frequency distribution of FIG. 5, the output value (BGL) of the low pass filter shifts to a side smaller than the average value of the knock signal KNK within the range of the frequency distribution of the knock signal KNK. Therefore, even though the frequency distribution of the knock signal KNK is distorted when knocking occurs, since the background level BGL is set close to the minimum value side of the frequency distribution of the knock signal KNK within the range of the frequency distribution of the knock signal KNK, it is hardly influenced by the distortion of frequency distribution. Then, since the knock decision threshold TH is set on the basis of the background level BGL, it can suppress that the knock decision threshold TH increases too much regardless of the distortion of frequency distribution. Therefore, the knock signal KNK exceeds the knock decision threshold TH, the knock occurrence intensity IKNK increases appropriately, and the angle retard of ignition timing can be performed appropriately.

In the present embodiment, in the low side frequency increase, in the case where the knock signal KNK is smaller than the output value of the low pass filter, the BGL calculation unit 52 sets the low side frequency to infinite frequency, and coincides the output value of the low pass filter with the knock signal KNK.

If the cutoff frequency is infinite frequency, the knock signal KNK passes the low pass filter directly, and the output value of the low pass filter coincides with the knock signal KNK. Conversely, in the case where the output value of the low pass filter coincides with the knock signal KNK, the cutoff frequency is set to infinite frequency. According to the above-mentioned configuration, the knock signal KNK which is smaller than the output value of the low pass filter passes the low pass filter directly, and the knock signal KNK which is larger than the output value of the low pass filter becomes difficult to pass the low pass filter. Therefore, the output value of the low pass filter can be brought more close to the minimum value of frequency distribution, and the background level BGL can be brought more close to the minimum value of frequency distribution of the knock signal KNK.

In the present embodiment, the BGL calculation unit 52 uses a discretized first order lag filter as the low pass filter. Specifically, as shown in a next equation, the first order lag filter is a processing which calculates a total value of a value, which multiplied an output value Yf(n−1) of the first order lag filter of the last time calculation cycle (in this example, the last time interrupt process) to a filter gain KF, and a value, which multiplied a value which subtracted the filter gain KF from 1 to an input value Uf(n) of the first order lag filter of this time calculation cycle (in this example, this time interrupt process), as the output value Yf(n) of the first order lag filter of this time calculation cycle. Data-processing load can be reduced by using such the first order lag filter.

$$Yf(n)=KF\times Yf(n-1)+(1-KF)\times Uf(n) \qquad (6)$$

Then, as shown in a next equation, in the low side frequency increase, in the case where the input value UF(n) of the first order lag filter of this time calculation cycle is smaller than the output value Yf(n−1) of the first order lag filter of the last time calculation cycle, the BGL calculation unit 52 sets the filter gain KF as the low side frequency to 0; in the case where the input value Uf(n) of the first order lag filter of this time calculation cycle is larger than the output value Yf(n−1) of the first order lag filter of the last time calculation cycle, the BGL calculation unit. 52 sets the filter gain KF as the high side frequency to a value which is larger than 0 and smaller than 1.

$$1) Uf(n)<Yf(n-1)$$

$$KF=0$$

$$2) Uf(n)>=Yf(n-1) \qquad (7)$$

$$KF=KFH$$

$$(0<KFH<1)$$

The cutoff frequency becomes low gradually as the filter gain KF approaches 1 from 0. The cutoff frequency becomes high gradually as the filter gain KF approaches 0 from 1, and the cutoff frequency becomes infinite in the case where the filter gain KF is 0.

The BGL calculation unit 52 calculates the background level BGL by processing the two or more steps of low pass filters to the knock signal KNK. The BGL calculation unit 52 performs the low side frequency increase about at least the first step low pass filter.

According to this constitution, since other filter processing, such as noise elimination low pass filter processing, is not performed to the raw knock signal KNK, but the low pass filter processing which performs the low side frequency increase is performed, the background level BGL can be brought close to the minimum value of the frequency distribution of the knock signal KNK.

The BGL calculation unit 52 performs a high side frequency increase which makes the high side frequency higher than the low side frequency about at least the final step low pass filter.

By the low pass filter which performs the low side frequency increase, the response delay of the output value of the low pass filter to negative side change of the knock signal KNK becomes small relatively, the response delay of the output value of the low pass filter to positive side change of the knock signal KNK becomes large relatively. According to the above-mentioned configuration, since the high side frequency increase is performed about at least the final step low pass filter, the response delay of the background level BGL to negative side change of the knock signal KNK can be increased relatively, and the response delay of the background level BGL to positive side change of the knock signal KNK can be decreased relatively. Therefore, the response of change of the background level BGL to negative side change of the knock signal KNK and the response of change of the background level BGL to positive side change of the knock signal KNK can be brought close. Therefore, regardless of change direction of the knock signal KNK, stable follow up response of the background level BGL can be obtained.

By the low pass filter processing which performs the high side frequency increase, although the output value of the low pass filter which performs the low side frequency increase shifts to the positive side, the output value of the low pass filter which performs low side frequency increase can be averaged, and the background level BGL can be stabilized.

In the BGL calculation unit 52, the low side frequencies and the high side frequencies in each of the low pass filters are set so that a time constant TCH (hereinafter, referred to as a high side time constant TCH) of change of the background level BGL to positive side step change of the knock signal KNK and a time constant TCL (hereinafter, referred to as a low side time constant TCL) of change of the background level BGL to negative side step change of the knock signal KNK become equivalent.

According to this constitution, by acceleration or deceleration of the internal combustion engine 1 and the like, a follow up response of the background level BGL in the case where the knock signal KNK changes to the positive side, and a follow up response of the background level BGL in the case where the knock signal KNK changes to the negative side can be coincided. Therefore, regardless of change direction of the knock signal KNK, equivalent follow up response of the background level BGL can be obtained.

Here, the high side time constant TCH and the low side time constant TCL become time after the knock signal KNK step-changes until the background level BGL reaches 63.2% of the final value. That the high side time constant TCH and the low side time constant TCL become equivalent means that the high side time constant TCH and the low side time constant TCL become within a range of ±10% mutually.

<In the Case of Two Steps Configuration>

Figure 6:
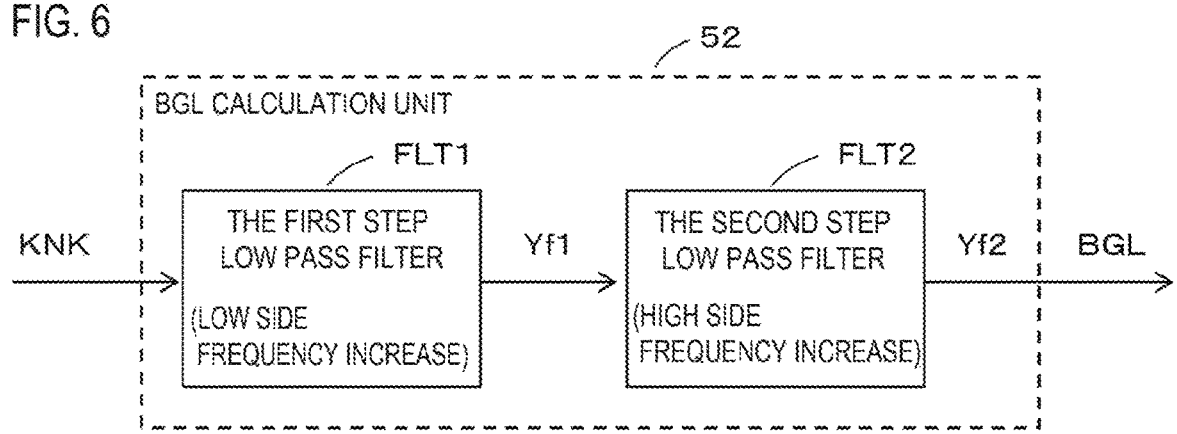
FIG. 6 is a block diagram of a BGL calculation unit in the case of two steps configuration according to Embodiment 1 of the present invention.

First, as shown in FIG. 6, the case where the low pass filters are two steps configuration is explained. In this case, the low side frequency increase is performed about the first step low pass filter FLT1, and the high side frequency increase is performed about the second step low pass filter FLT2 which becomes the final step.

The first step low pass filter FLT1 is configured by the first order lag filter as a next equation. Here, Yf1 is an output value of the first step first order lag filter FLT1. KF1 is a filter gain of the first step first order lag filter FLT1; in the case where the knock signal KNK (n) is smaller than the last time output value Yf1 (n−1) of the first order lag filter, KF1 is set to a first step low side gain KF1L which is set to 0; in the case where the knock signal KNK (n) is larger than the last time output value Yf1 (n−1) of the first order lag filter (in this example, in the case of larger than or equal to), KF1 is set to a first step high side gain KF1H which is set to a value larger than 0 and smaller than 1. By this setting, since the first step low side frequency becomes infinite and becomes higher than the first step high side frequency, the low side frequency increase is performed.

$$Yf1(n)=KF1 \times Yf1(n-1)+(1-KF1) \times KNK(n)$$

1) $KNK(n)<Yf1(n-1)$ $$KF1=KF1L=0$$

2) $KNK(n)>=Yf1(n-1)$ \hfill (8)

$$KF1=KF1H$$

$$(0<KF1H<1)$$

The second step low pass filter FLT2 is configured by the first order lag filter as a next equation. Here, Yf2 is an output value of the second step first order lag filter FLT2. KF2 is a filter gain of the second step first order lag filter FLT2; in the case where this time output value Yf1 (n) of the first step first order lag filter is smaller than the last time output value Yf2 (n−1) of the second step first order lag filter, KF2 is set to a second step low side gain KF2L; in the case where this time output value Yf1 (n) of the first step first order lag filter is larger than the last time output value Yf2 (n−1) of the second step first order lag filter (in this example, in the case of larger than or equal to), KF2 is set to a second step high side gain KF2H. The second step low side gain KF2L is preliminarily set to a value larger than 0, smaller than 1, and larger than the second step high side gain KF2H. The second step high side gain KF2H is preliminarily set to a value larger than 0, smaller than 1, and smaller than the second step low side gain KF2L. By this setting, since the second step high side frequency becomes higher than the second step low side frequency, the high side frequency increase is performed.

$$Yf2(n)=KF2 \times Yf2(n-1)+(1-KF2) \times Yf1(n)$$

$$BGL(n)=Yf2(n)$$

1) $Yf1(n)<Yf2(n-1)$ $$KF2=KF2L$$

2) $Yf1(n)>=Yf2(n-1)$ \hfill (9)

$$KF2=KF2H$$

$$(0<KF2H<KF2L<1)$$

As shown in a next equation, the time constant TC (arrival time to 63.2%) of each first order lag filter becomes a value which multiplied −1 to a value which divided the calculation cycle ΔT of the first order lag filter by the natural logarithm of the filter gain KF of the first order lag filter.

$$TC=-\Delta T/LN(KF)$$ \hfill (10)

The time constant (arrival time to 63.2%) of whole of plural steps of the first order lag filter can be calculated by a total value of the time constants of the first order lag filter of each step. As shown in a next equation, the high side time constant TCH becomes a total value of the first step high side time constant corresponding to the first step high side gain KF1H and the second step high side time constant corresponding to the second step high side gain KF2H. The low side time constant TCL becomes a total value of the first step low side time constant corresponding to the first step low side gain KF1L and the second step low side time constant corresponding to the second step low side gain KF2L. Then, the high side gains KF1H, KF2H of each step and the low side gains KF1L, KF2L of each step are set so that the high side time constant TCH and the low side time constant TCL become equal.

$$TCH=-\Delta T/LN(KF1H)-\Delta T/LN(KF2H)$$

$$TCL=-\Delta T/LN(KF1L)-\Delta T/LN(KF2L)$$ \hfill (11)

$$TCH=TCL$$

For example, as shown in a next equation, in the case where the calculation cycle ΔT is 0.1 [sec] and the first step and the second step high side gains KF1H, KF2H are set to 0.8187, the high side time constant TCH becomes 1.0 [sec]. In this case, in order to make the low side time constant TCL and the high side time constant TCH equal, the second step low side gain KF2L is set to 0.9048.

$$\Delta T=0.1$$

$$KF1H=KF2H=0.8187$$ \hfill (12)

$$KF1L=0, KF2L=0.9048$$

$$TCH=TCL=1.0$$

Figure 7:
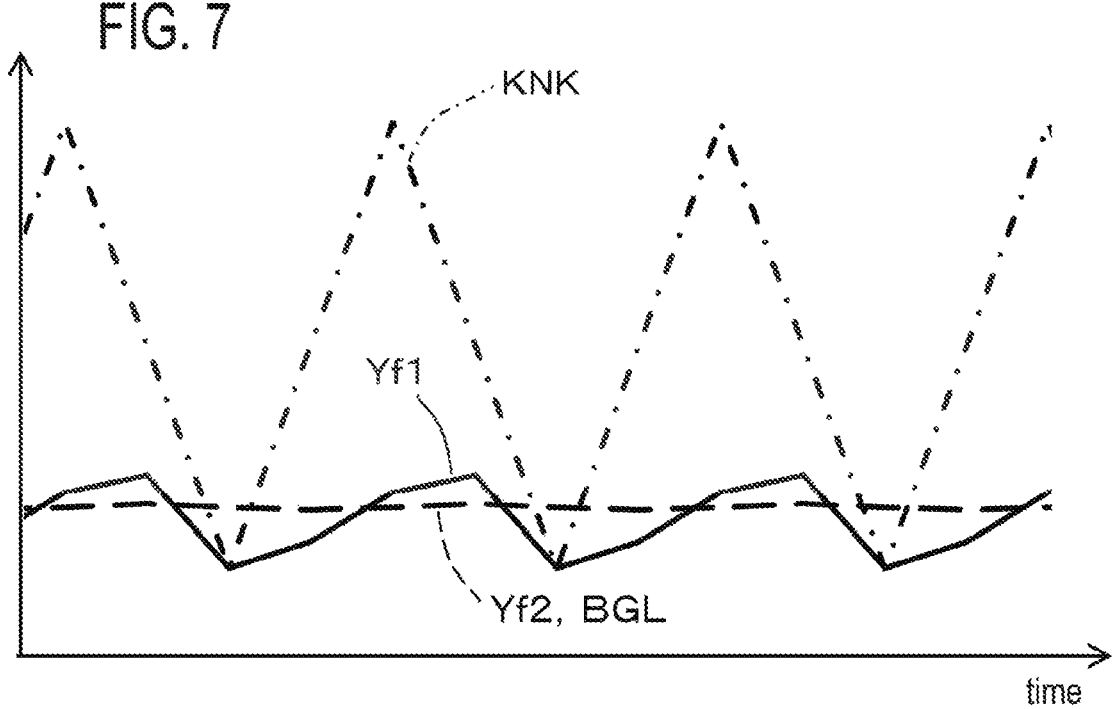
FIG. 7 is a time chart for explaining calculation of background level in the case of two steps configuration according to Embodiment 1 of the present invention.

The behavior of the first step and the second step first order lag filters FLT1, FLT2 is shown in FIG. 7. The knock signal KNK is periodically varied with oscillation range which changes is accordance with occurrence state of knocking and operating condition. Although the calculation cycle is rough, the output value Yf1 of the first step first order lag filter which performs the low side frequency increase coincides with the knock signal KNK in the case where the knock signal KNK is smaller than the output value Yf1, but the output value Yf1 is changing toward the knock signal KNK with first order lag in the case where the knock signal KNK is larger than the output value Yf1. So, the output value Yf1 of the first step first order lag filter is periodically varied between the minimum value of the knock signal KNK and a value which is higher than the minimum value by a predetermined value, synchronizing with the cycle variation of the knock signal KNK. By the second step first order lag fitter FLT2 which performs the high side frequency increase, the output value Yf1 of the first step first order lag filter can be averaged, and the background level BGL can be stabilized.

Figure 5:
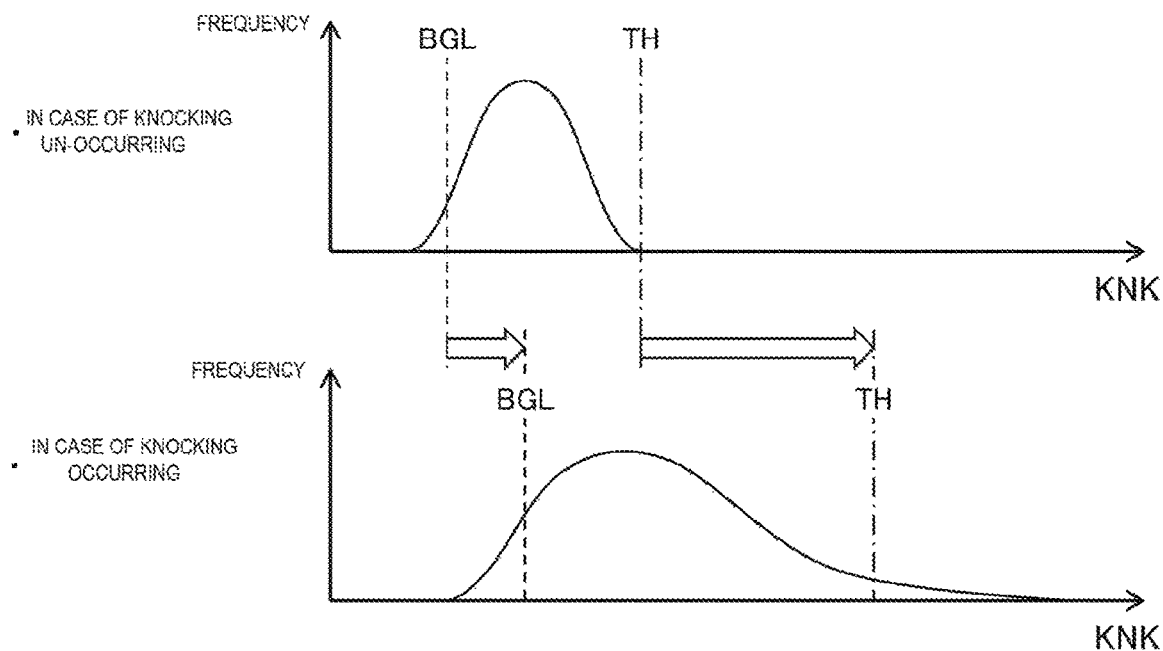
FIG. 5 is a figure for explaining calculation of background level in the case of two steps configuration according to Embodiment 1 of the present invention.

If the first step high side gain KF1H is brought more close to 1 and the first step high side frequency is made lower, the oscillation maximum value of output value Yf1 of the first step first order lag filter can be brought more close to the minimum value of the knock signal KNK and the background level BGL can be brought more close to the minimum value of the knock signal KNK. On the other hand, since the followability of the background level BGL in transition after the oscillation behavior of the knock signal KNK changes is deteriorated, the first step high side frequency cannot be made excessively low. However, even the two steps filter configuration can be bringing the background level BGL close to the minimum value of the knock signal KNK. FIG. 5 mentioned above is a figure in this two steps configuration.

Figure 8:
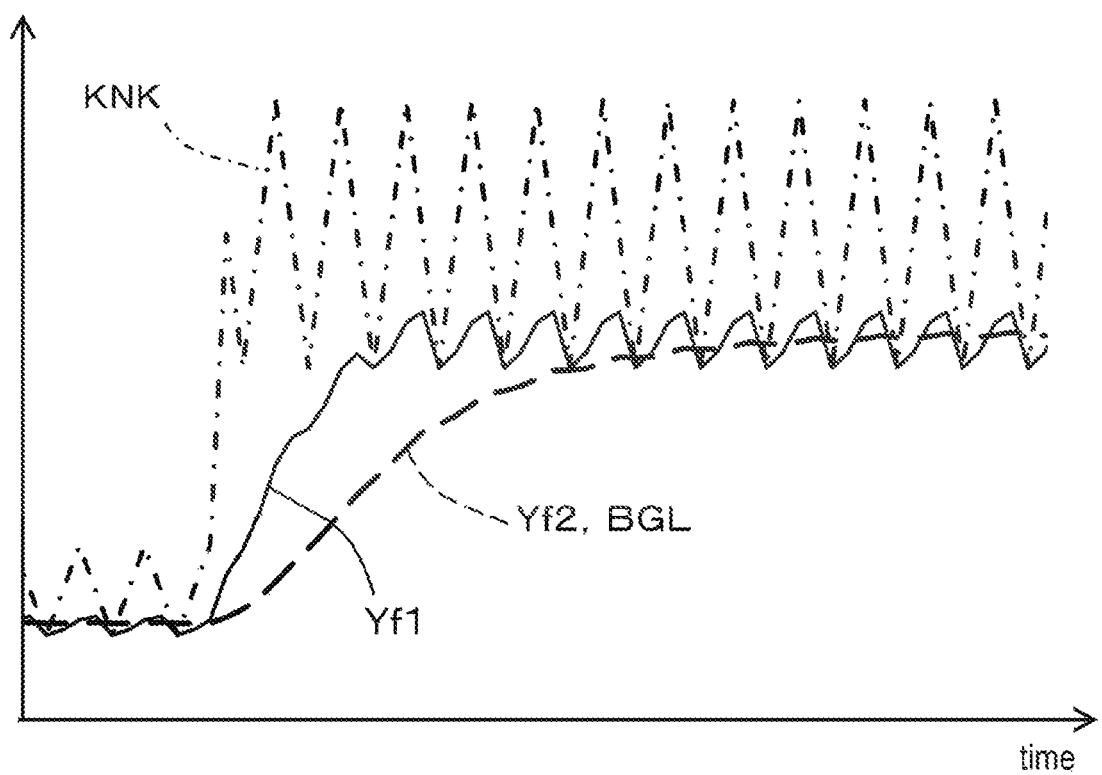
FIG. 8 is a time chart for explaining behavior of background level in transition in the case of two steps configuration according to Embodiment 1 of the present invention.
Figure 9:
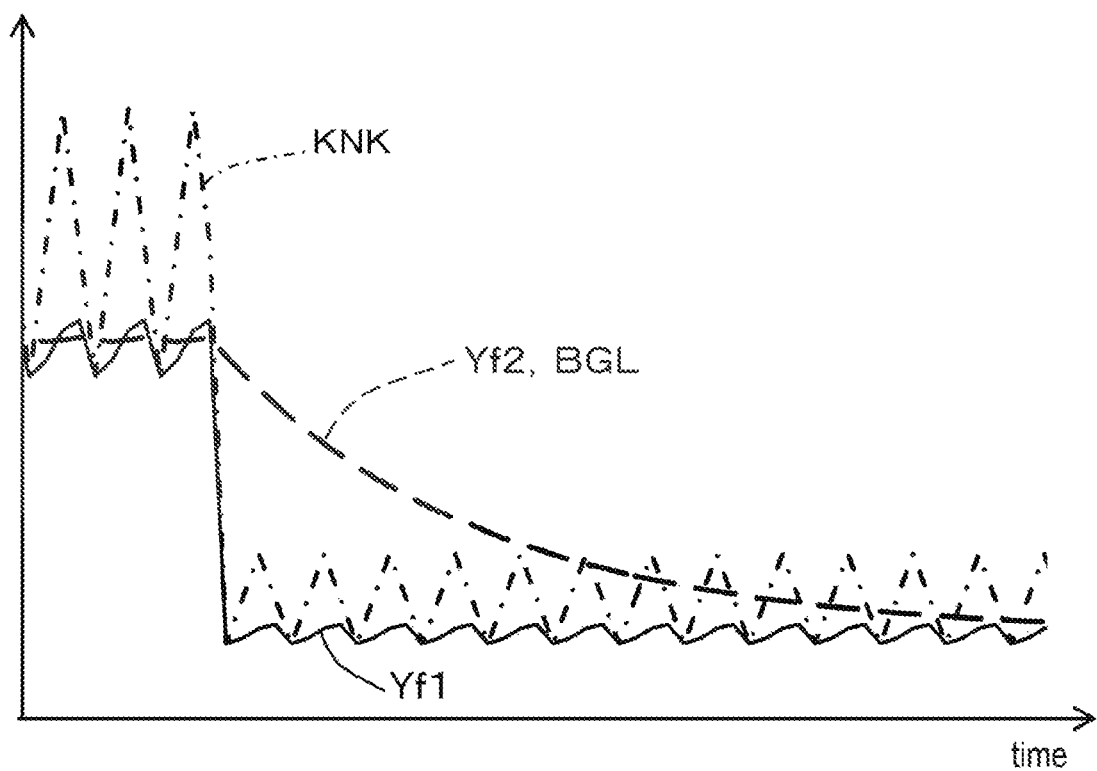
FIG. 9 is a time chart for explaining behavior of background level in transition in the case of two steps configuration according to Embodiment 1 of the present invention.

FIG. 8 shows a transient response of the background level BGL in the case where the oscillation range of the knock signal KNK varies stepwise to the positive side by acceleration or deceleration of the internal combustion engine 1 and the like; FIG. 9 shows a transient response of the background level BGL in the case where the oscillation range of the knock signal KNK varies stepwise to the negative side. Since the low side time constant TCL and the high side time constant TCH are made equal, the follow up response of the background level BGL to positive side variation of the knock signal KNK and the follow up response of the background level BGL to negative side variation of the knock signal KNK can be coincided. Therefore, regardless of change direction of the oscillation range of the knock signal KNK, the stable follow up response of the background level BGL can be obtained.

<In the Case of Three Steps Configuration>

Figure 10:
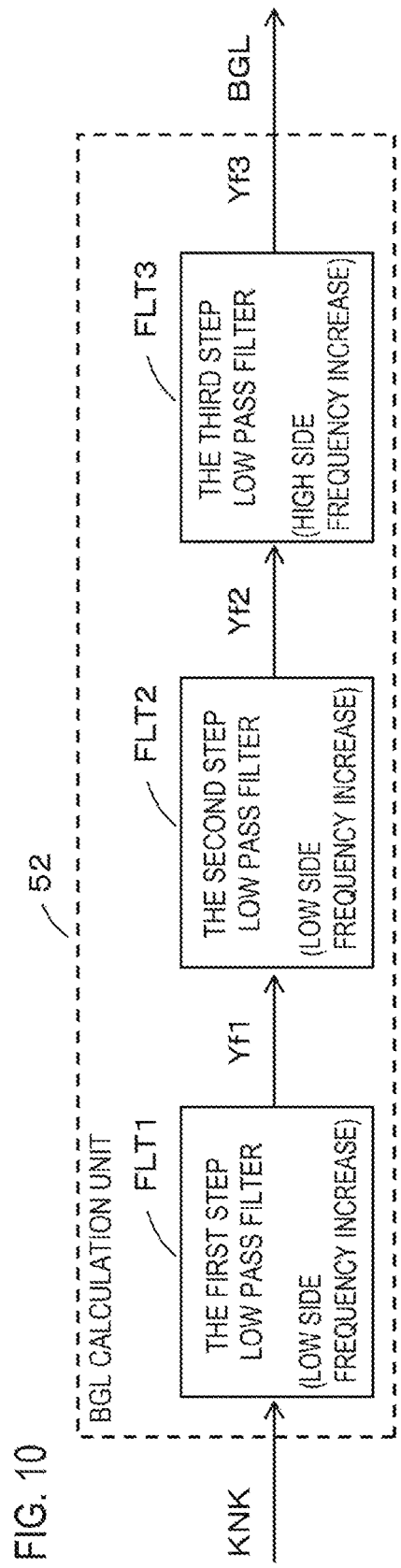
FIG. 10 is a block diagram of a BGL calculation unit in the case of three steps configuration according to Embodiment 1 of the present invention.

Next, as shown in FIG. 10, the case where the low pass filters are three steps configuration is explained. In this case, the low side frequency increase is performed about the first step low pass filter FLT1 and the second step low pass filter FLT2, and the high side frequency increase is performed about the third step low pass filter FLT3 which becomes the final step.

The first step low pass filter FLT1 is configured by the first order lag filter as a next equation as is the case with the two steps configuration. Here, Yf1 is as output value of the first step first order lag filter FLT1. KF1 is a filter gain of the first step first order lag filter FLT1; in the case where the knock signal KNK (n) is smaller than the last time output value Yf1 (n−1) of the first order lag filter, KF1 is set to a first step low side gain KF1L which is set to 0; in the case where the knock signal KNK (n) is larger than the last time output value Yf1 (n−1) of the first order lag filter (in this example, in the case of larger than or equal to), KF1 is set to a first step high side gain KF1H which is set to a value larger than 0 and smaller than 1. By this setting, since the first step low side frequency becomes infinite and becomes higher than the first step high side frequency, the low side frequency increase is performed.

$$Yf1(n) = KF1 \times Yf1(n-1) + (1-KF1) \times KNK(n)$$

1) $KNK(n) < Yf1(n-1)$ $$KF1 = KF1L = 0$$

2) $KNK(n) >= Yf1(n-1)$ \hfill (13)

$$KF1 = KF1H$$

$$(0 < KF1H < 1)$$

The second step low pass filter FLT2 is configured by the first order lag filter as a next equation as is the case with the first step. Here, Yf2 is an output value of the second step first order lag filter FLT2. KF2 is a filter gain of the second step first order lag filter FLT2; in the case where the output value Yf1 (n) of the first step first order lag filter is smaller than the last time output value Yf2 (n−1) of the second step first order lag filter, KF2 is set to a second step low side gain KF2L which is set to 0; in the case where the output value Yf1 (n) of the first step first order lag filter is larger than the last time output value Yf2 (n−1) of the second step first order lag filter (in this example, in the case of larger than or equal to), KF2 is set to a second step high side gain KF2H which is set to a value larger than 0 and smaller than 1. By this setting, since the second step low side frequency becomes infinite and becomes higher than the second step high side frequency, the low side frequency increase is performed.

$$Yf2(n) = KF2 \times Yf2(n-1) + (1-KF2) \times Yf1(n)$$

1) $Yf1(n) < Yf2(n-1)$ $$KF2 = KF2L = 0$$

2) $Yf1(n) >= Yf2(n-1)$ \hfill (14)

$$KF2 = KF2H$$

$$(0 < KF2H < 1)$$

The third step low pass filter FLT3 is configured by the first order lag filter as a next equation as is the case with the second step of the two steps configuration. Here, Yf3 is an output value of the third step first order lag filter FLT3. KF3 is a filter gain of the third step first order lag filter FLT3; in the case where this time output value Yf2 (n) of the second step first order lag filter is smaller than the last time output value Yf3 (n−1) of the third step first order lag filter, KF3 is set to a third step low side gain KF3L; in the case where this time output value Yf2 (n) of the second step first order lag filter is larger than the last time output value Yf3 (n−1) of the third step first order lag filter (in this example, in the case of larger than or equal to), KF3 is set to a third step high side gain KF3H. The third step low side gain KF3L is preliminarily set to a value larger than 0, smaller than 1, and larger than the third step high side gain KF3H. The third step high side gain KF3H is preliminarily set to a value larger than 0, smaller than 1, and smaller than the third step low side gain KF3L. By this setting, since the third step high side frequency becomes higher than the third step low side frequency, the high side frequency increase is performed.

$$Yf3(n) = KF3 \times Yf3(n-1) + (1-KF3) \times Yf2(n)$$

$$BGL(n) = Yf3(n)$$

1) $Yf2(n) < Yf3(n-1)$ $$KF3 = KF3L$$

2) $Yf2(n) >= Yf3(n-1)$ \hfill (15)

$$KF3 = KF3H$$

$$(0 < KF3H < KF3L < 1)$$

As shown in a next equation, the high side gains KF1H, KF2H, KF3H of each step and the low side gains KF1L, KF2L, KF3L of each step are set so that the high side time constant TCH and the low side time constant TCL become equal.

$$\Delta T = 0.1$$

$$KF1H = KF2H = KF3H = 0.7408 \hspace{1cm} (16)$$

$$KF1L = KF2L = 0, KF3L = 0.9048$$

$$TCH = TCL = 1.0$$

Figure 11:
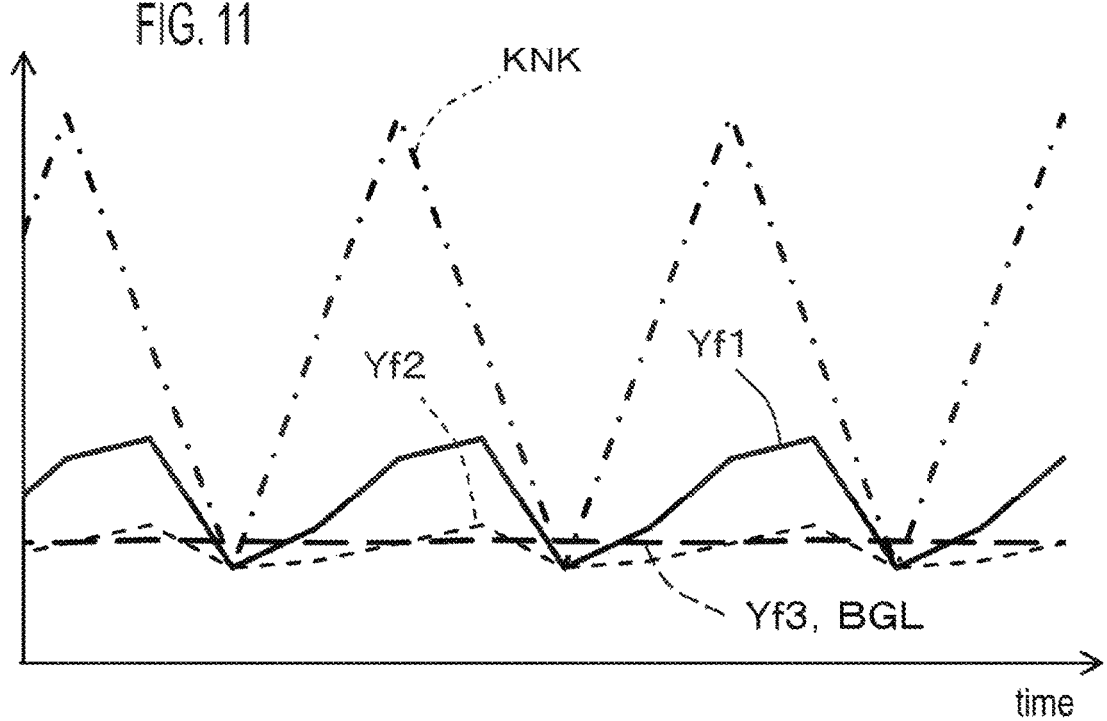
FIG. 11 is a time chart for explaining calculation of background level in the case of three steps configuration according to Embodiment 1 of the present invention.

The behavior of the first step, the second step, and the third step first order lag filter FLT1, FLT2, FLT3 is shown in FIG. 11. The oscillation range of output value Yf2 of the second step first order lag filter is smaller than the oscillation range of output value Yf1 of the first step, and the oscillation maximum value of output value Yf2 of the second step is approaching the minimum value of the knock signal KNK rather than the oscillation maximum value of output value Yf1 of the first step. Therefore, the background level BGL can be brought more close to the minimum value of the knock signal KNK rather than the case of the two steps configuration.

Figure 12:
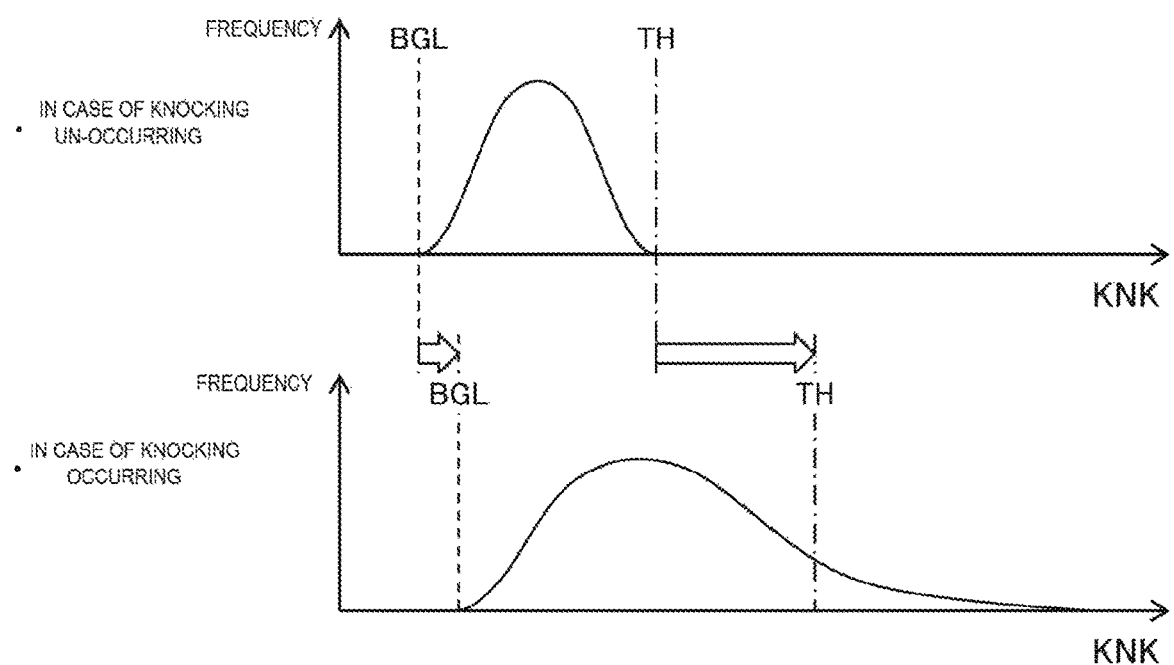
FIG. 12 is a figure for explaining calculation of background level in the case of three steps configuration according to Embodiment 1 of the present invention.

In the case of three steps configuration, the frequency distribution of the knock signal KNK and the calculated value of the background level BGL and the knock decision threshold TH are shown in FIG. 12. As shown in this figure, by the three steps configuration, the background level BGL can be brought more close to the minimum value of the knock signal KNK rather than the case of the two steps configuration of FIG. 5, and setting of the knock decision threshold TH is more hardly influenced by distortion of the frequency distribution of the knock signal KNK.

Figure 13:
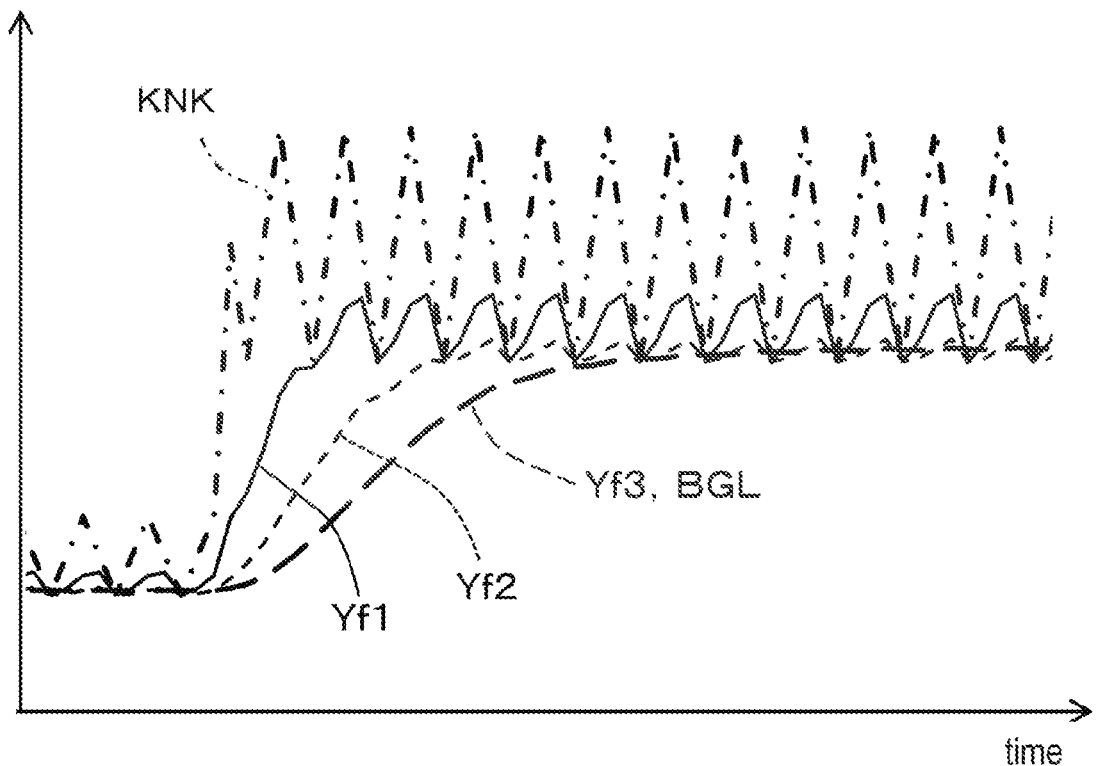
FIG. 13 is a time chart for explaining behavior of background level in transition in the case of three steps configuration according to Embodiment 1 of the present invention.
Figure 14:
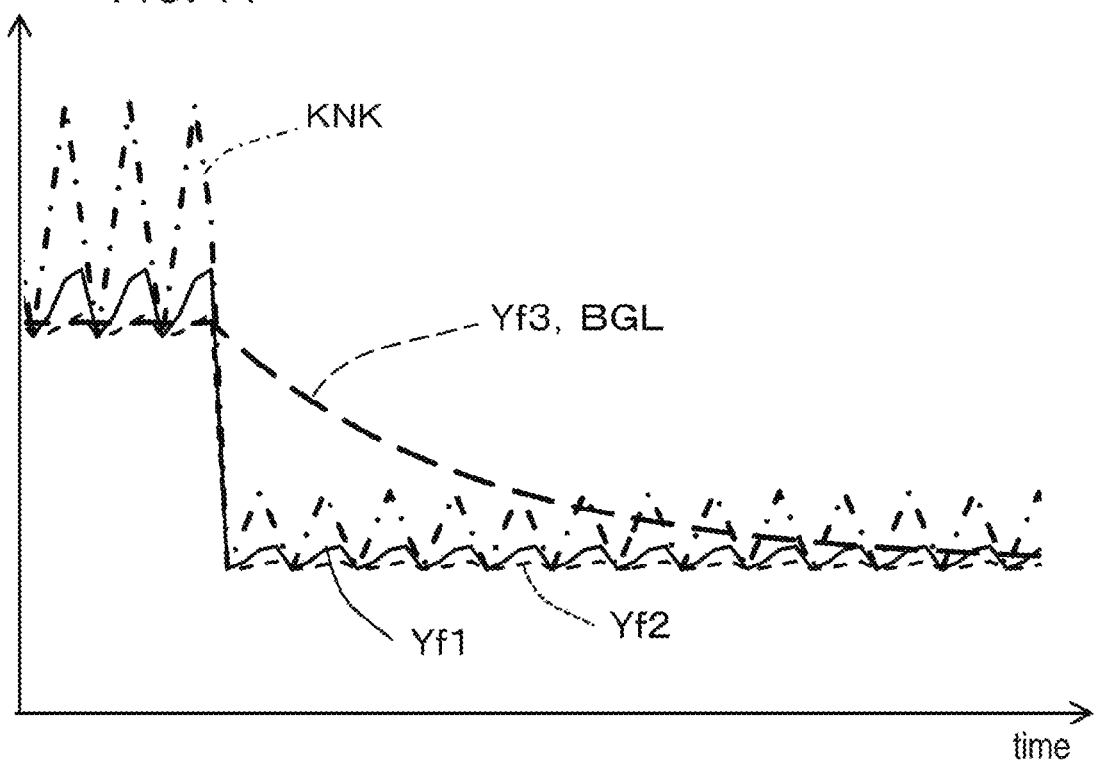
FIG. 14 is a time chart for explaining behavior of background level in transition in the case of three steps configuration according to Embodiment 1 of the present invention.

FIG. 13 shows a transient response of the background level BGL in the case where the oscillation range of the knock signal KNK varies stepwise to the positive side by acceleration or deceleration of the internal combustion engine 1 and the like; FIG. 14 shows a transient response of the background level BGL in the case where the oscillation range of the knock signal KNK varies stepwise to the negative side. Since the low side time constant TCL and the high side time constant TCH are made equal, the follow up response of the background level BGL to positive side variation of the knock signal KNK and the follow up response of the background level BGL to negative side variation of the knock signal KNK can be coincided. Therefore, regardless of change direction of the oscillation range of the knock signal KNK, the stable follow up response of the background level BGL can be obtained.

<Minimum Value Detection Processing>

As mentioned above, the low pass filter which performs the low side frequency increase is performed in order to detect the value close to the minimum value of the frequency distribution of the knock signal KNK. That is to say, the BGL calculation unit 52 calculates the background level BGL by performing a minimum value detection processing to the knock signal KNK. The concrete method of the minimum value detection processing is the low pass filter which performs the low side frequency increase in the present embodiment. The minimum value detection processing is a processing which can calculate a value between a minimum value of oscillation range of the knock signal KNK and a value which added 20% of oscillation range of the knock signal KNK to the minimum value at least in steady state where oscillation of the knock signal KNK is stable.

<Flow Chart>

Figure 15:
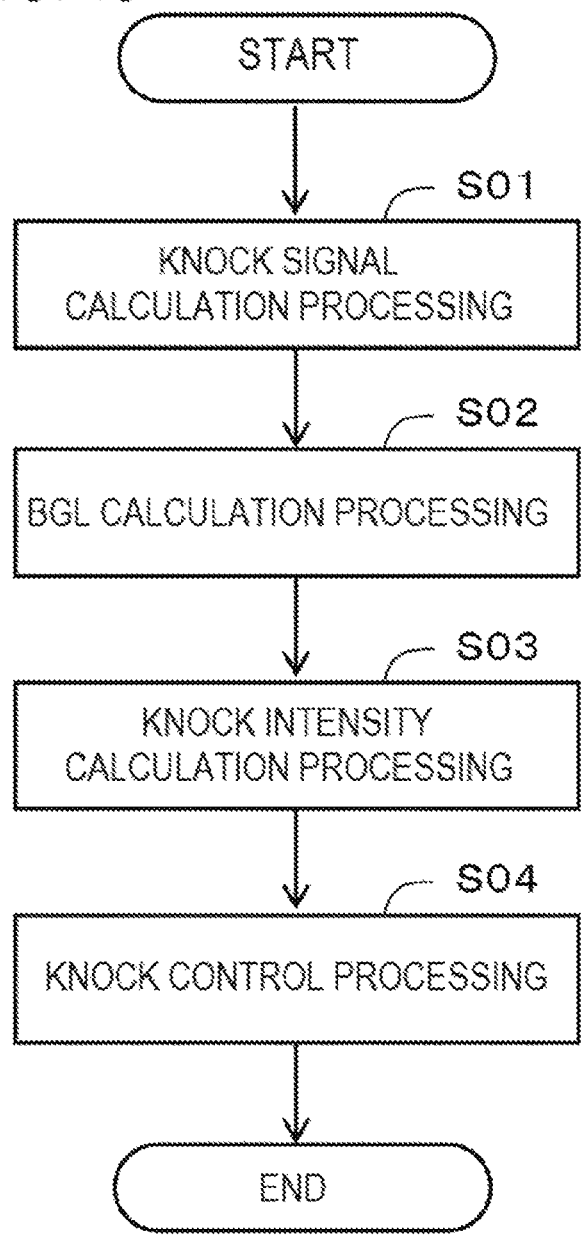
FIG. 15 is a flowchart representing the processing by the controller according to Embodiment 1 of the present invention.

The procedure (the control method of the internal combustion engine 1) of schematic processing of the controller 50 concerning the present embodiment is explained based on the flow chart shown in FIG. 15. The processing represented in the flowchart in FIG. 15 is recurrently executed every predetermined operation cycle by the computing processing unit 90 executing software (a program) stored in the storage apparatus 91.

In the step S01, the knock signal calculation unit 51 implements a knock signal calculation processing (a knock signal calculation step) for, as mentioned above, calculating a knock signal KNK, which represents a feature component of knocking, based on an output signal of a combustion condition detection sensor (in this example, the Knock sensor 12) which outputs a signal in accordance with a combustion condition of the internal combustion engine 1.

Next, in the step S02, the BGL calculation unit. 52 implements a BGL calculation processing (a BGL calculation step) for, as mentioned above, calculating the background level BGL based on the knock signal KNK. The BGL calculation unit 52 calculates the background level BGL by processing a low pass filter to the knock signal KNK. At this time, the BGL calculation unit 52 performs a low side frequency increase which makes a low side frequency, which is a cutoff frequency of the low pass filter in the case where the knock signal KNK is smaller than an output value of the low pass filter, higher than a high side frequency, which is a cutoff frequency of the low pass filter in the case where the knock signal KNK is larger than the output value of the low pass filter.

Then, in the step S03, the knock intensity calculation unit 54 implements a knock intensity calculation processing (a knock intensity calculation step) for, as mentioned above, calculating a knock occurrence intensity IKNK based on the knock signal. KNK and the knock decision threshold TH.

In the step S04, the knock control unit 55 implements a knock control processing (a knock control step) for, as mentioned above, changing a control parameter (in this example, ignition timing) of the internal combustion engine 1 so as to suppress occurrence of knocking in accordance with the knock occurrence intensity IKNK.

Other Embodiments

Lastly, other embodiments of the present invention will be explained. Each of the configurations of embodiments to be explained below is not limited to be separately utilized but can be utilized in combination with the configurations of other embodiments as long as no discrepancy occurs.

(1) In Embodiment 1, there has been explained the case where the knock sensor 12 is used as the combustion condition detection sensor. However, embodiments of the present invention are not limited to the foregoing case. That is to say, as long as the combustion condition detection sensor is a sensor which outputs a signal in accordance with the combustion condition of the internal combustion engine 1, it may be any sensor, for example, may be a cylinder internal pressure sensor which detects the pressure in the cylinder 25. Since oscillation component is superimposed on pressure in the cylinder 25 in the case where knocking occurs, the knock signal calculation unit 51 can calculate the knock signal KNK by performing time-frequency analysis as well as the Embodiment 1 to an output signal of the cylinder internal pressure sensor.

(2) In Embodiment 1, there has been explained the case where the knock control unit 55 changes ignition timing as the control parameter in accordance with the knock occurrence intensity IKNK. However, embodiments of the present invention are not limited to the foregoing case. That is to say, the knock control unit 55 may change any control parameter, as long as it is a control parameter of the internal combustion engine 1 which can suppress occurrence of knocking. For example, the control parameter may be any one or more of ignition timing, valve opening and closing timing of an intake variable valve timing mechanism, intake air amount, and rich amount of fuel injection.

Specifically, the knock control unit 55 changes opening and closing timing of the intake valve to the advance angle side in the case where the knock occurrence intensity IKNK is high, and changes opening and closing timing of the intake valve to the retard angle side in the case where the knock occurrence intensity IKNK is low. The knock control unit 55 decreases intake air amount taken into the cylinder 25 by decreasing throttle opening angle and the like in the case where the knock occurrence intensity IKNK is high, and increases intake air amount taken into the cylinder 25 by increasing throttle opening angle and the like in the case where the knock occurrence intensity IKNK is low. The knock control unit 55 increases rich amount of fuel injection from the theoretical air fuel ratio in the case where the knock occurrence intensity IKNK is high, and decreases rich amount of fuel injection from the theoretical air fuel ratio in the case where the knock occurrence intensity IKNK is low.

(3) In Embodiment 1, there has been explained the case where, in the low side frequency increase, in the case where the knock signal KNK is smaller than the output value of the low pass filter, the BGL calculation unit 52 sets the low side frequency to infinite frequency (sets the filter gain KF of low side to 0), and coincides the output value of the low pass filter with the knock signal KNK. However, embodiments of the present invention are not limited to the foregoing case. That is to say, in the low side frequency increase, as long as the low side frequency is frequency higher than the high side frequency, it may be set to any frequency. And, the filter gain KF of low side may be set to a value between 0 and the filter gain KF of high side.

(4) in Embodiment 1, there has been explained the case where the first order lag filter is used as the low pass filter of the BGL calculation unit 52. However, embodiments of the present invention are not limited to the foregoing case. That is to say, a high order low pass filter of the second- and higher-order may be used as the low pass filter of the BGL calculation unit 52.

(5) In Embodiment 1, there has been explained the case where the BGL calculation unit 52 performs two steps or three steps of the low pass filters to the knock signal KNK. However, embodiments of the present invention are not limited to the foregoing case. That is to say, the BGL calculation unit 52 may calculate the background level BGL by processing one step of the low pass filter, or three or more steps of the low pass filters to the knock signal KNK. In the case of the one step configuration, the low side frequency increase is performed about the first step low pass filter. In the case of the three or more steps configuration, the low side frequency increase is performed about the one or more consecutive steps of the low pass filters from the first step.

(6) In Embodiment 1, there has been explained the case where, in the three steps configuration, the BGL calculation unit 52 performs the low side frequency increase about two consecutive steps from the first step, that is, the first step and the second step low pass filters, and performs the high side frequency increase about the third step (final step) low pass filter. However, embodiments of the present invention are not limited to the foregoing case. That is to say, in the case of performing two or more steps of the low pass filters, the BGL calculation unit 52 may perform the low side frequency increase about at least the first step low pass filter, for example, in the case of the three steps configuration, the low side frequency increase may be performed about the first step low pass filter, and the high side frequency increase may be performed about the second step and the third step low pass filters.

In the case of performing three or more steps of the low pass filter, the BGL calculation unit 52 may perform the low side frequency increase about two or more consecutive steps of the low pass filters from the first step. For example, in the case of performing four steps of the low pass filters, the BGL calculation unit 52 may perform the low side frequency increase about three consecutive steps from the first step, that is, the first step, the second step, and the third step low pass filters, and may perform the high side frequency increase about the fourth step (final step) low pass filter.

(7) In Embodiment 1, there has been explained the case where the high side frequency increase is performed about the final step low pass filter. However, embodiments of the present invention are not limited to the foregoing case. That is to say, as the final step low pass filter, the normal low pass filter, which does not perform a frequency change, that is, the high side frequency and the low side frequency are equal, may be used. Even in this case, the background level BGL can be stabilized.

(8) In Embodiment 1, there has been explained the case where, in the BGL calculation unit 52, the low side time constant TCL and the high side time constant TCH are equivalent. However, embodiments of the present invention are not limited to the foregoing case. That is to say, the low side time constant TCL and the high side time constant TCH may not be equivalent.

(9) In Embodiment 1, there has been explained the case where, in the case of the two steps configuration, the first step and the second step high side gains KF1H, KF2H are set to the same value as shown in the equation (12), and in the case of the three steps configuration, the first step, the second step, and the third step high side gains KF1H, KF2H, KF3H are set to the same value as shown in the equation (16). However, embodiments of the present invention are not limited to the foregoing case. That is to say, the high side gains of each step may be set to mutually different values.

(10) In Embodiment 1, there has been explained the case where the BGL calculation unit 52 performs the low pass filter which performs the low side frequency increase, in order to detect the value close to the minimum value of the frequency distribution of the knock signal KNK. However, embodiments of the present invention are not limited to the foregoing case. That is to say, the BGL calculation unit 52 may use any processing method as long as it is the minimum value detection processing. For example, the BGL calculation unit 52 may perform processing which extracts the minimum value from a plurality of the knock signals KNK calculated in the present and past interrupt processes of preliminarily set processing times, as a minimum value detection processing, instead of the low pass filter which performs the low side frequency increase.

Various modifications and alterations of this invention will be apparent to those skilled in the art without departing from the scope and spirit of this invention, and it should be understood that this is not limited to the illustrative embodiments set forth herein.

What is claimed is:

1. A controller for an internal combustion engine comprising at least one processor configured to implement:
   a knock signal calculator that calculates a knock signal based on an output signal of a combustion condition detection sensor which outputs a signal in accordance with a combustion condition of the internal combustion engine;
   a BGL calculator that calculates a background level based on the knock signal;
   a knock decision threshold calculator that calculates a knock decision threshold based on the background level;
   a knock intensity calculator that calculates a knock occurrence intensity based on the knock signal and the knock decision threshold; and
   a knock controller that changes a control parameter of the internal combustion engine so as to suppress occurrence of knocking in accordance with the knock occurrence intensity,
   wherein the BGL calculator calculates the background level by processing a low pass filter to the knock signal; and performs a low side frequency increase which makes a low side frequency, which is a cutoff frequency of the low pass filter in the case where the knock signal is smaller than an output value of the low pass filter, higher than a high side frequency, which is a cutoff frequency of the low pass filter in the case where the knock signal is larger than the output value of the low pass filter.

2. The controller for the internal combustion engine according to claim 1, wherein in the low side frequency increase, in the case where the knock signal is smaller than the output value of the low pass filter, the BGL calculator sets the low side frequency to infinite frequency, and coincides the output value of the low pass filter with the knock signal.

3. The controller for the internal combustion engine according to claim 1, wherein the BGL calculator uses a discretized first order lag filter as the low pass filter; the first order lag filter is a processing which calculates a total value of a value, which multiplied an output value of the first order lag filter of the last time calculation cycle to a filter gain, and a value, which multiplied a value which subtracted the filter gain from 1 to an input value of the first order lag filter of this time calculation cycle, as the output value of the first order lag filter of this time calculation cycle;
in the low side frequency increase, in the case where the input value of the first order lag filter is smaller than the output value of the first order lag filter of the last time calculation cycle, the BGL calculator sets the filter gain as the low side frequency to 0; in the case where the input value of the first order lag filter is larger than the output value of the first order lag filter of the last time calculation cycle, the BGL calculator sets the filter gain as the high side frequency to a value which is larger than 0 and smaller than 1.

4. The controller for the internal combustion engine according to claim 1, wherein the BGL calculator calculates the background level by processing the two or more steps of low pass filters to the knock signal, and performs the low side frequency increase about at least the first step low pass filter.

5. The controller for the internal combustion engine according to claim 4, wherein the BGL calculator processes the three or more steps of low pass filters, and performs the low side frequency increase about the two or more consecutive steps of the low pass filters from the first step.

6. The controller for the internal combustion engine according to claim 4, wherein the BGL calculator performs a high side frequency increase which makes the high side frequency higher than the low side frequency about at least the final step low pass filter.

7. The controller for the internal combustion engine according to claim 6, wherein in the BGL calculator, the low side frequency and the high side frequency in each of the low pass filters are set so that a time constant of change of the background level to positive side step change of the knock signal and a time constant of change of the background level to negative side step change of the knock signal become equivalent.

8. The controller for the internal combustion engine according to claim 1, wherein the combustion condition detection sensor is a knock sensor which detects vibration of the internal combustion engine, or a cylinder internal pressure sensor which detects pressure in cylinder of the internal combustion engine.

9. The controller for the internal combustion engine according to claim 1, wherein the control parameter is any one or more of ignition timing, phase of an intake variable valve timing mechanism, intake air amount, and rich amount of fuel injection.

10. A control method for an internal combustion engine comprising:
calculating a knock signal based on an output signal of a combustion condition detection sensor which outputs a signal in accordance with a combustion condition of the internal combustion engine;
calculating a background level based on the knock signal;
calculating a knock decision threshold based on the background level;
calculating a knock occurrence intensity based on the knock signal and the knock decision threshold; and
changing a control parameter of the internal combustion engine so as to suppress occurrence of knocking in accordance with the knock occurrence intensity,
wherein in calculating the background level, calculating the background level by processing a low pass filter to the knock signal; and performs a low side frequency increase which makes a low side frequency, which is a cutoff frequency of the low pass filter in the case where the knock signal is smaller than an output value of the low pass filter, higher than a high side frequency, which is a cutoff frequency of the low pass filter in the case where the knock signal is larger than the output value of the low pass filter.

* * * * *